Figure 16:
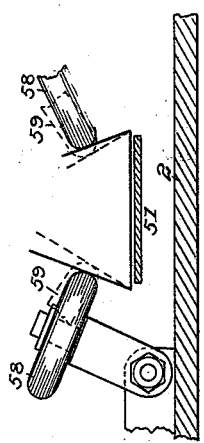

(No Model.)
9 Sheets—Sheet 1.
H. R. CORKHILL, Jr.
MACHINE FOR MAKING SHELLS FOR SLIDING BOXES.
No. 554,987.
Patented Feb. 18, 1896.
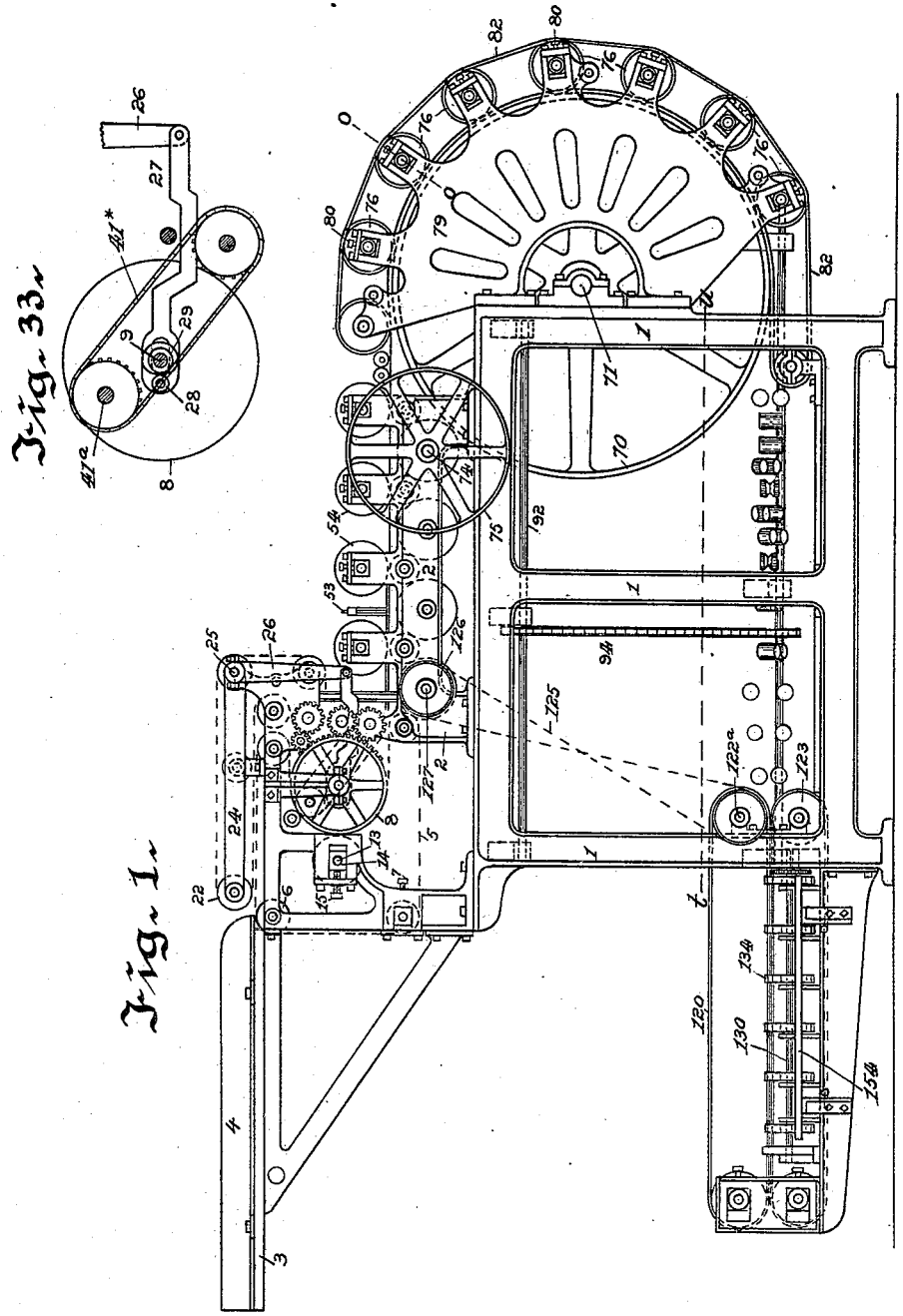
Witnesses
O. C. Robbins,
G. A. Roda.
Inventor
Henry R. Corkhill Jr.

(No Model.)  9 Sheets—Sheet 2.
H. R. CORKHILL, Jr.
MACHINE FOR MAKING SHELLS FOR SLIDING BOXES.
No. 554,987.  Patented Feb. 18, 1896.
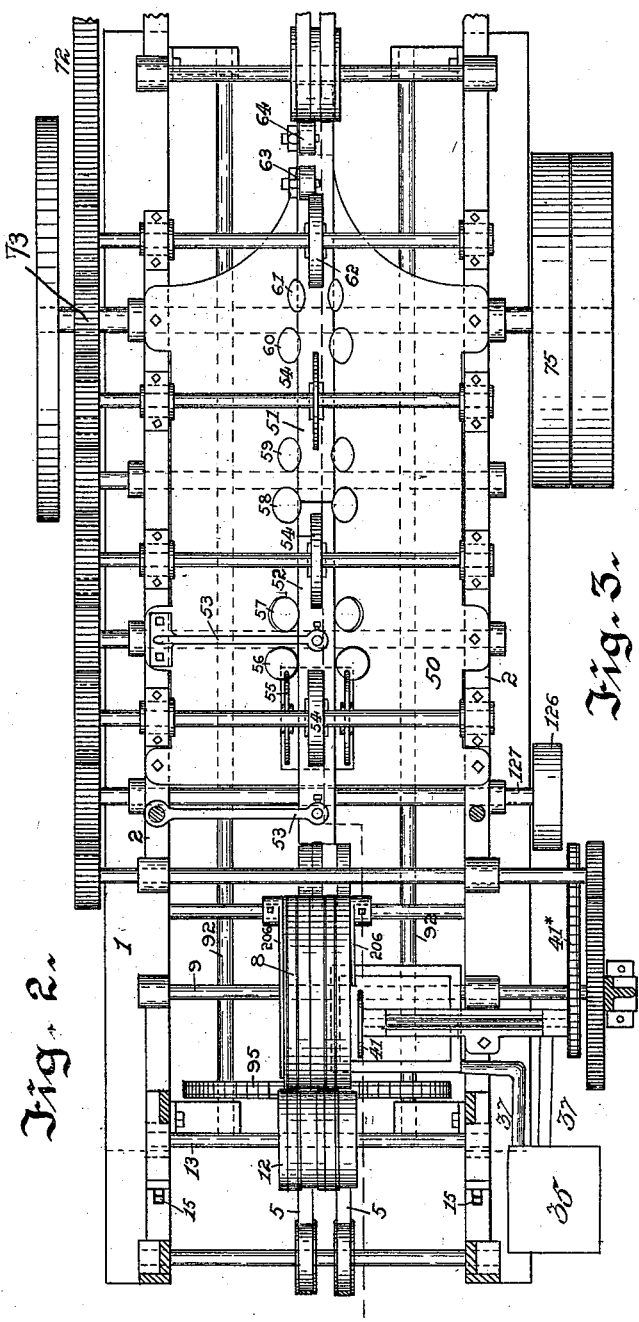
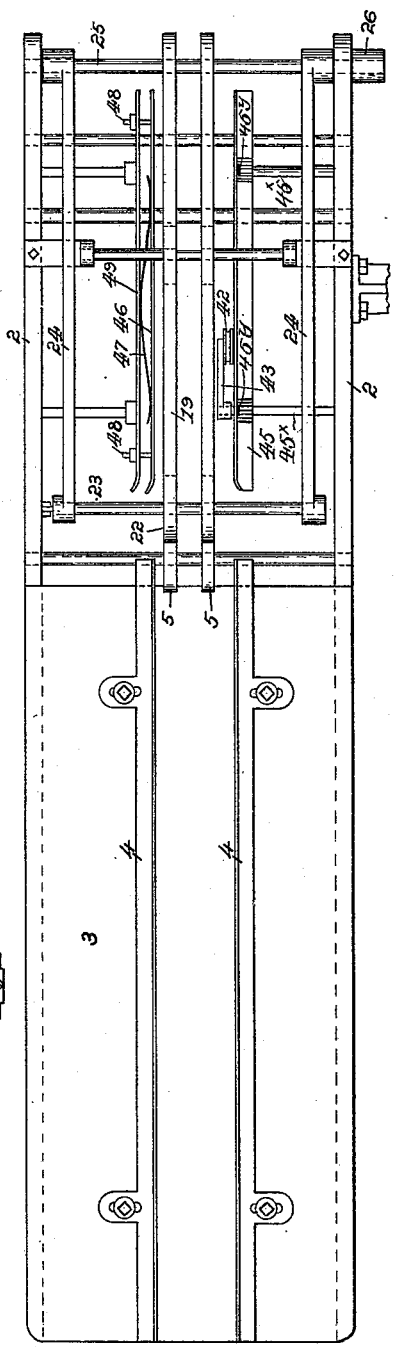

(No Model.)  9 Sheets—Sheet 3.
H. R. CORKHILL, Jr.
MACHINE FOR MAKING SHELLS FOR SLIDING BOXES.
No. 554,987.  Patented Feb. 18, 1896.
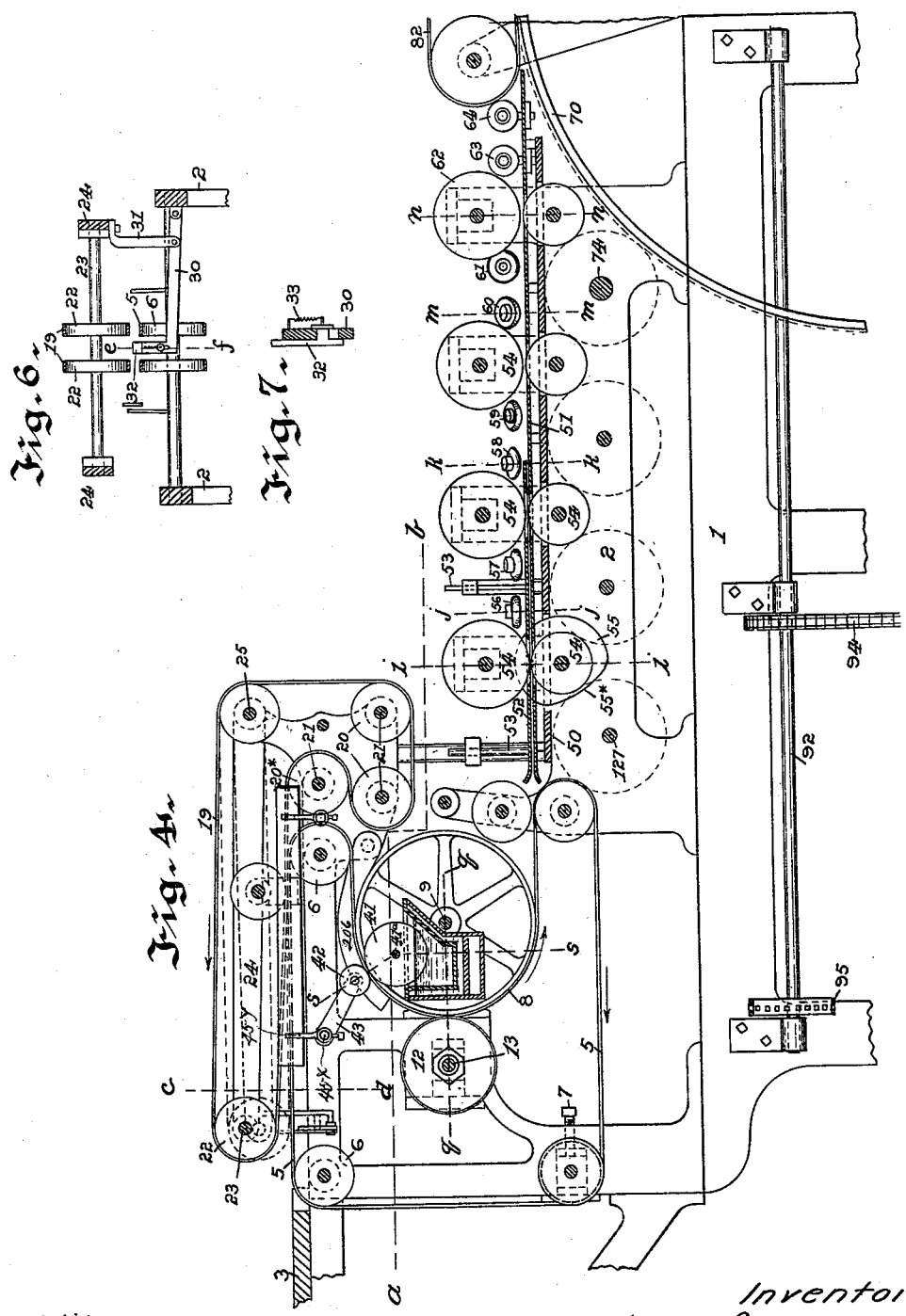
Witnesses.
O. C. Robbins
G. A. Roda
Inventor
Henry R. Corkhill Jr.
Church & Church
his Attys (No Model.)  9 Sheets—Sheet 4.
H. R. CORKHILL, Jr.
MACHINE FOR MAKING SHELLS FOR SLIDING BOXES.
No. 554,987.  Patented Feb. 18, 1896.
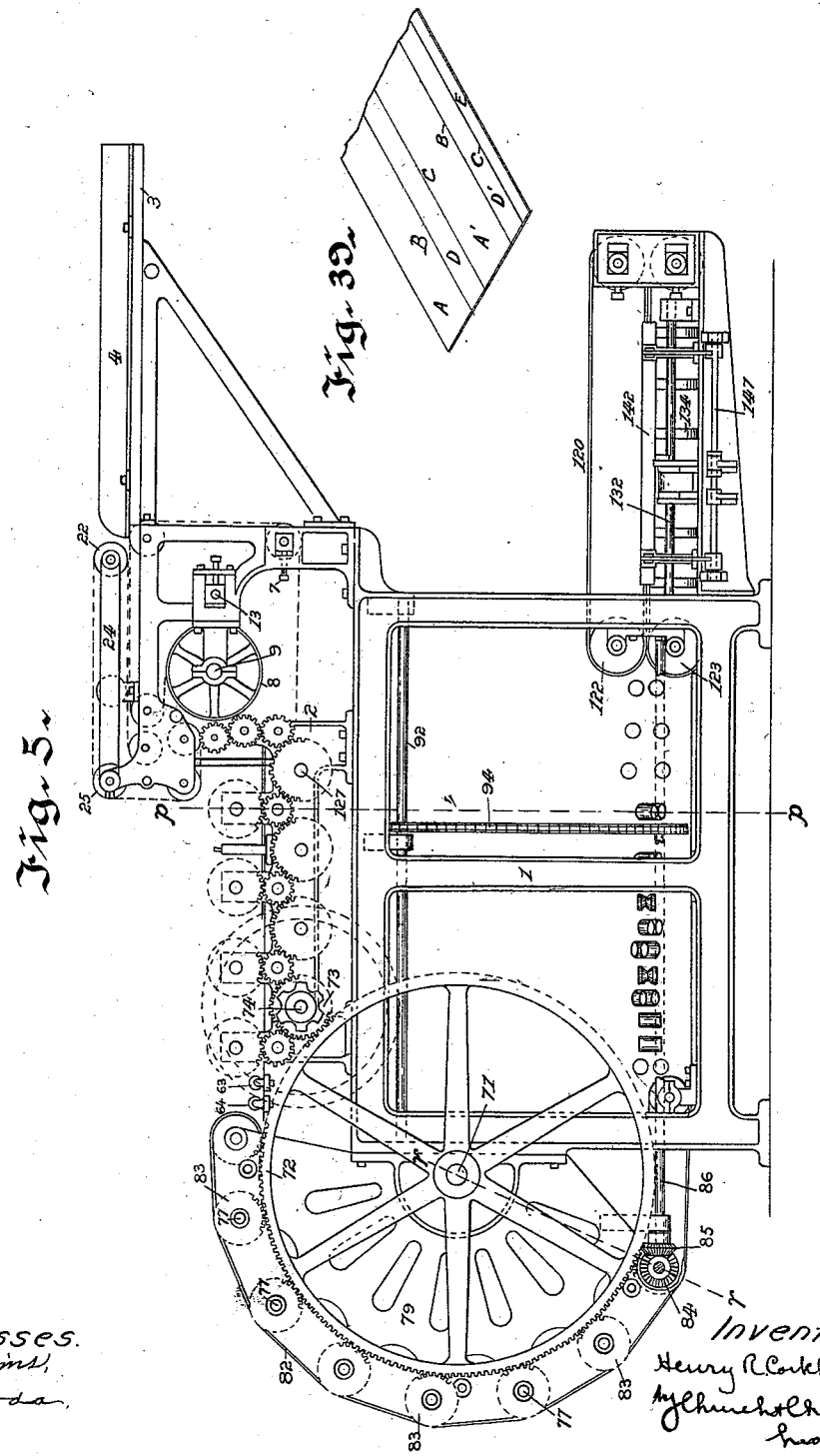

(No Model.)
9 Sheets—Sheet 5.
H. R. CORKHILL, Jr.
MACHINE FOR MAKING SHELLS FOR SLIDING BOXES.
No. 554,987.
Patented Feb. 18, 1896.
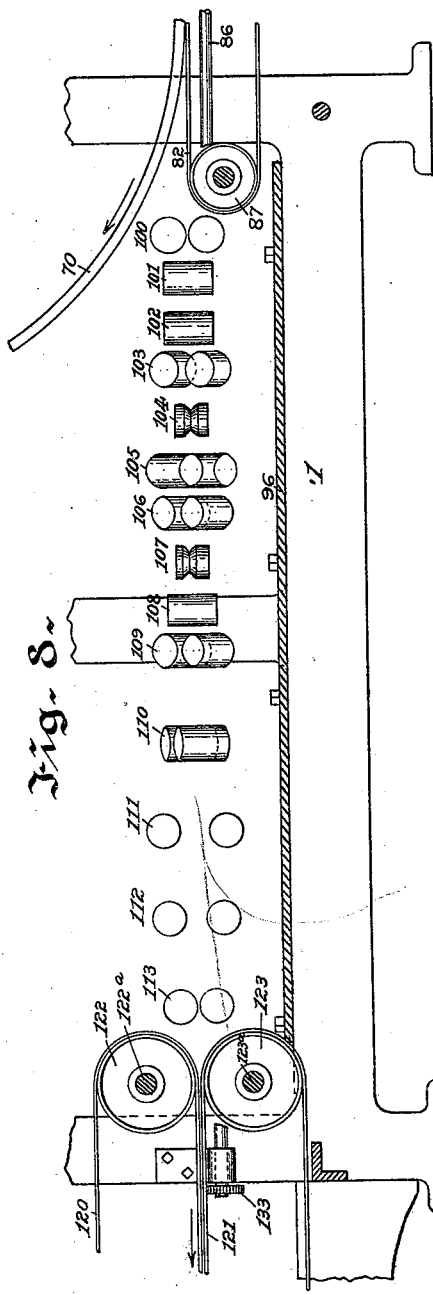
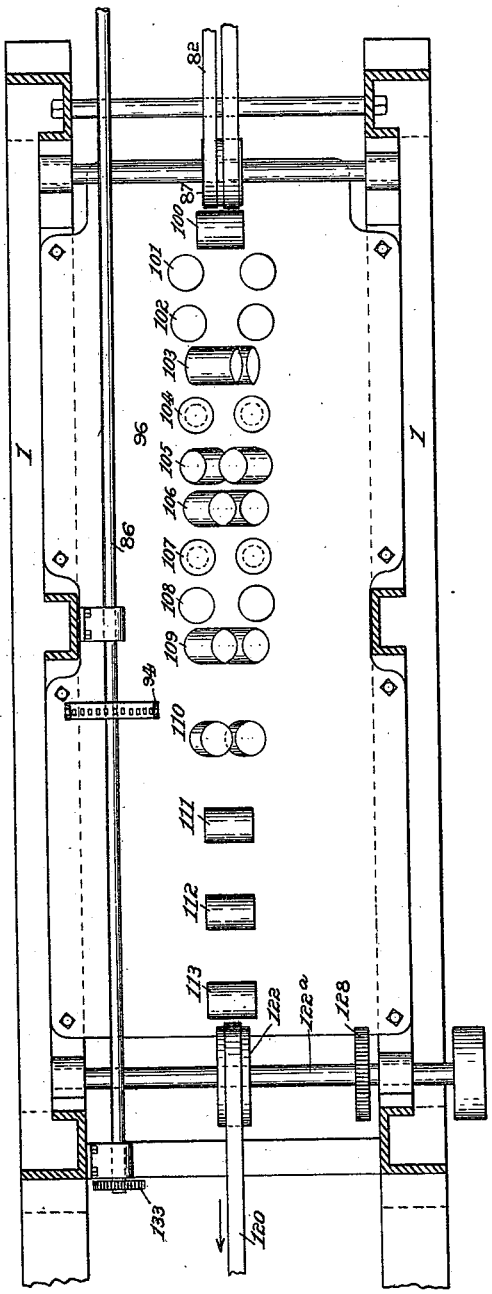
Witnesses
O. C. Robbins,
G. A. Roda.
Inventor
Henry R. Corkhill Jr.
by Church & Church
his attys.

(No Model.) 9 Sheets—Sheet 6.
H. R. CORKHILL, Jr.
MACHINE FOR MAKING SHELLS FOR SLIDING BOXES.
No. 554,987. Patented Feb. 18, 1896.
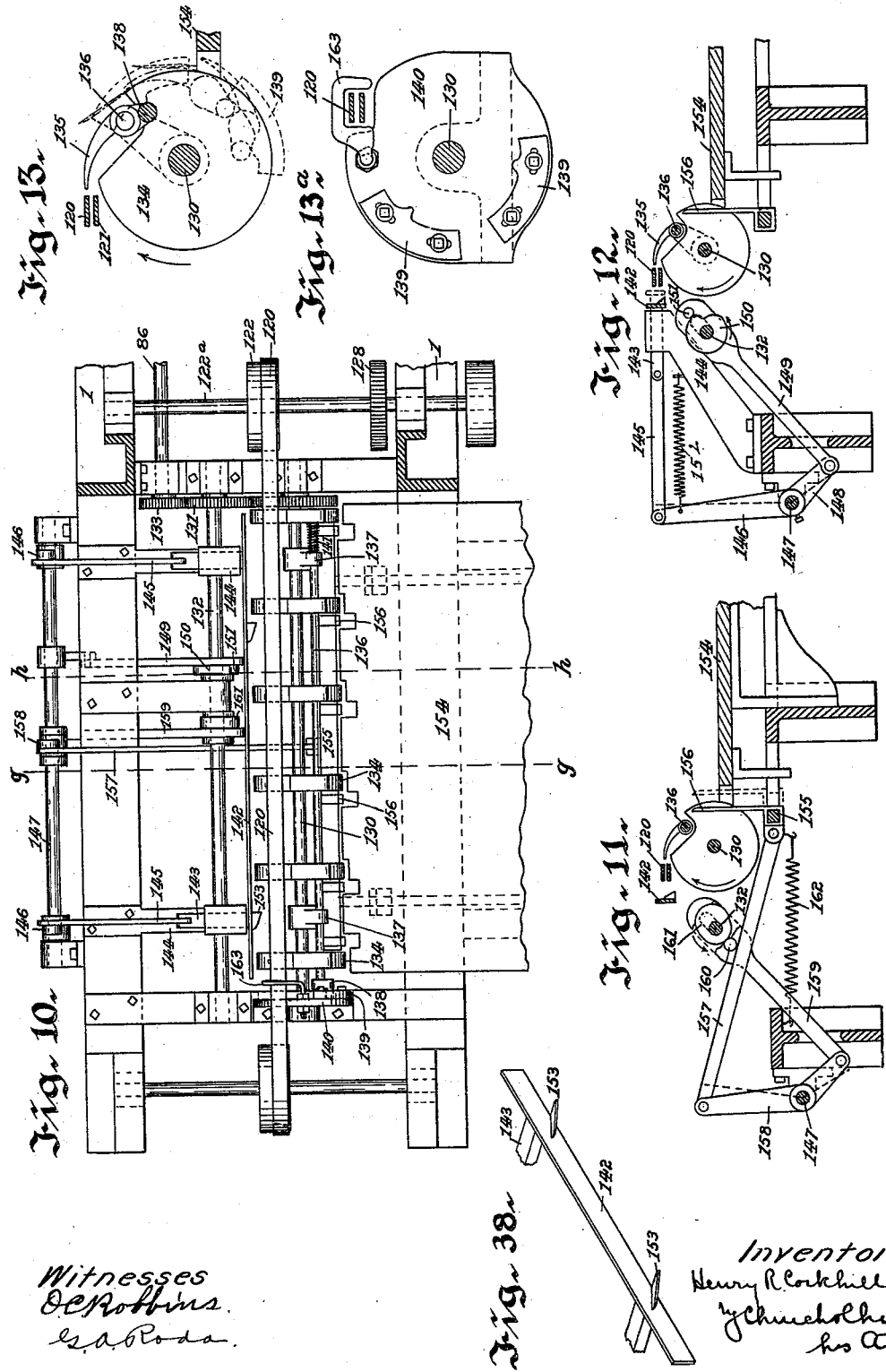
Witnesses
O. C. Robbins
E. A. Roda
Inventor
Henry R. Corkhill Jr
by Church & Church
his Attys (No Model.) 9 Sheets—Sheet 7.
H. R. CORKHILL, Jr.
MACHINE FOR MAKING SHELLS FOR SLIDING BOXES.
No. 554,987. Patented Feb. 18, 1896.

Witnesses
O. C. Robbin.
G. A. Roda.

Inventor
Henry R. Corkhill Jr.
by Church & Church
his Attys (No Model.) 9 Sheets—Sheet 8.
H. R. CORKHILL, Jr.
MACHINE FOR MAKING SHELLS FOR SLIDING BOXES.
No. 554,987. Patented Feb. 18, 1896.
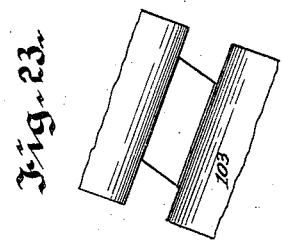
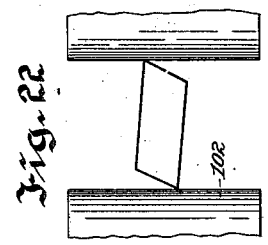
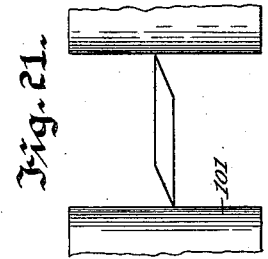
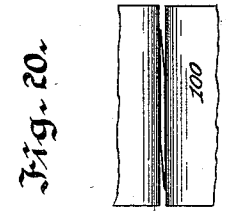
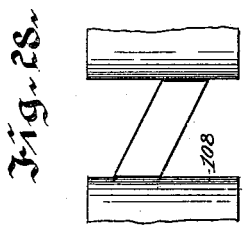
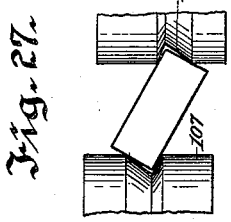
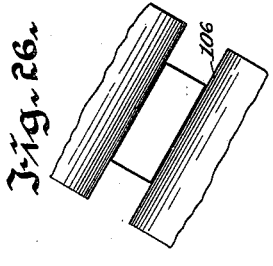
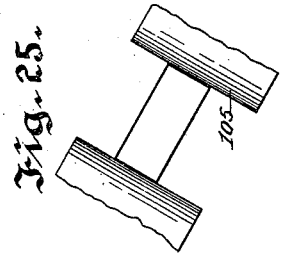
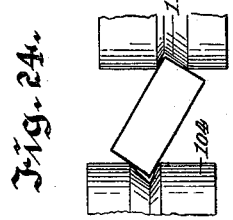
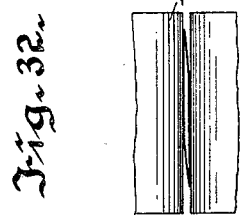
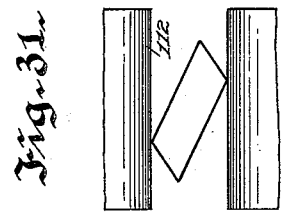
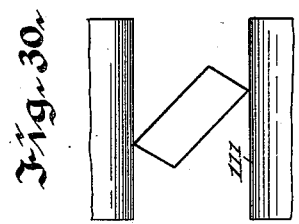
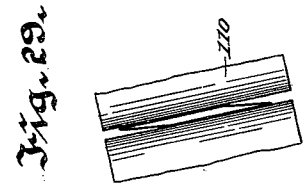
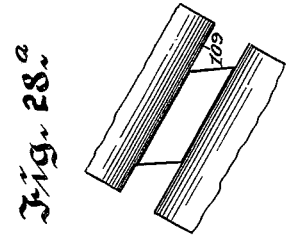
Witnesses
Inventor
Henry R Corkhill Jr
his Attys (No Model.) 9 Sheets—Sheet 9.
H. R. CORKHILL, Jr.
MACHINE FOR MAKING SHELLS FOR SLIDING BOXES.
No. 554,987. Patented Feb. 18, 1896.
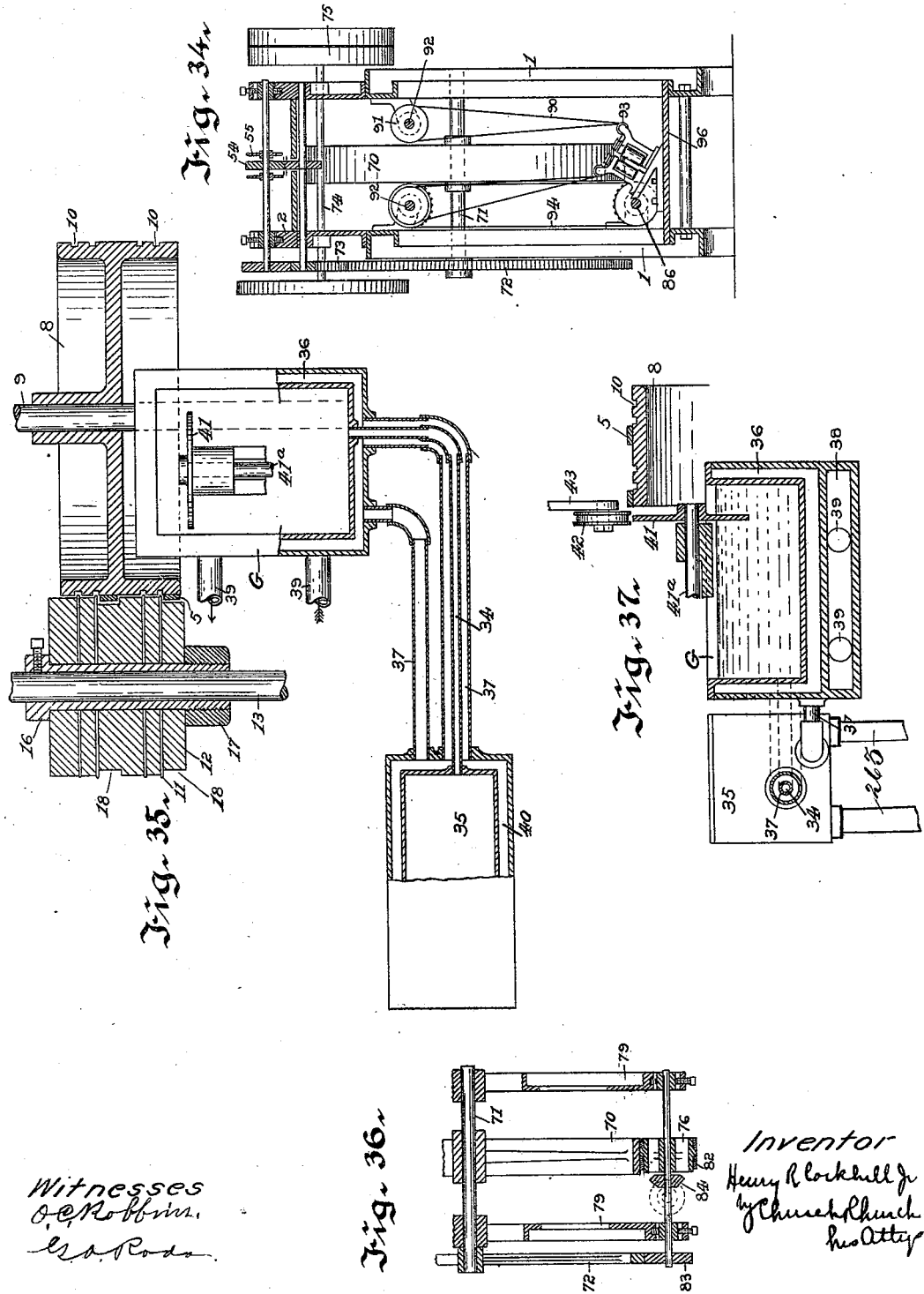

UNITED STATES PATENT OFFICE.

HENRY R. CORKHILL, JR., OF ROCHESTER, NEW YORK, ASSIGNOR TO THE STECHER LITHOGRAPHIC COMPANY, OF SAME PLACE.

MACHINE FOR MAKING SHELLS FOR SLIDING BOXES.

SPECIFICATION forming part of Letters Patent No. 554,987, dated February 18, 1896.

Application filed April 1, 1895. Serial No. 544,032. (No model.)

*To all whom it may concern:*

Be it known that I, HENRY R. CORKHILL, Jr., of Rochester, in the county of Monroe and State of New York, have invented certain new and useful Improvements in Machines for Making Shells for Sliding Boxes; and I do hereby declare the following to be a full, clear, and exact description of the same, reference being had to the accompanying drawings, forming a part of this specification, and to the reference letters and numerals marked thereon.

My present invention has for its object to provide a machine for making the exteriors or shells of sliding boxes, whereby such shells can be made in quantity and at a nominal cost, the complete machine shown herein being so constructed and operated that the blanks or strips of cardboard, each preferably adapted to form a number of shells, may be fed to the machine, the cardboard scored or creased at the points where it is desired to fold it, and then pasted and formed into a flat tube, each side of which embodies two of the proximate sides of the complete shell with a scored line between, then bending back or "breaking" the cardboard on said scored or creased lines on which it has not been bent during the folding, and finally delivering the tubes so that they may be cut up into separate shells, if desired, the scored or creased lines being sufficiently broken or rendered flexible, so that the shells may be readily set up to receive the slides. It is obvious that though the present machine is adapted to accomplish all of these operations and that automatically, the various novel instrumentalities employed may, some of them, be used in other connections or on a machine of a different class.

I find that it is eminently desirable that the cardboard tubes or shells be bent on the scored lines before they are delivered from the machine, as otherwise in the attempt to set up the shells by hand there is a liability of bending or breaking the board at other places than where it is scored or creased for the purpose, and I therefore embody in my present machine means for causing this breaking back and for feeding out or packing the long tubes in compact piles, so that they may be readily transported to the cutting-machine adapted to sever these tubes into the desired number of smaller shells.

With the above objects in view my present invention consists in certain improvements, all as will be hereinafter described and the novel features pointed out in the claims at the end of this specification.

Figure 15:
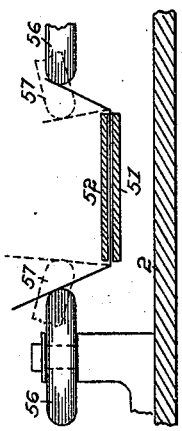
Figure 14:
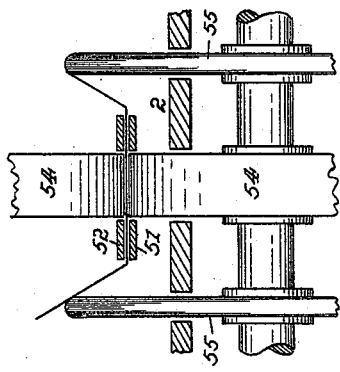
Figure 18:
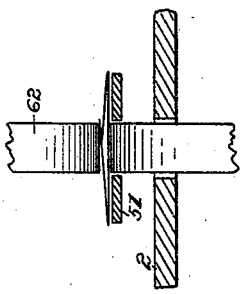
Figure 17:
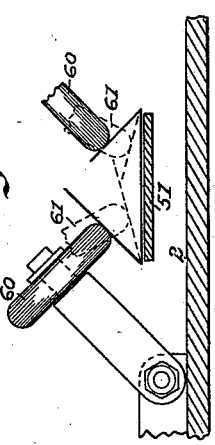
Figure 19:
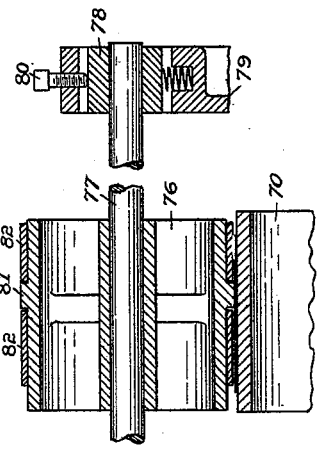
Figure 41:
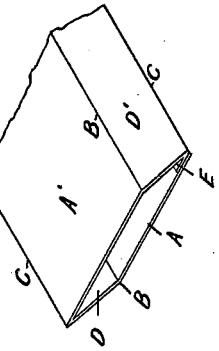
Figure 40:
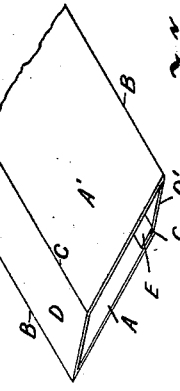

In the accompanying drawings, Figure 1 is a side elevation of a machine constructed in accordance with my invention; Fig. 2, a horizontal section on the line $a\,b$ of Fig. 4, looking down; Fig. 3, a plan view of the feeding end of the machine; Fig. 4, a longitudinal sectional view of the upper portion of the machine, showing the blank folding and feeding mechanism; Fig. 5, an elevation of the other side of the machine from that shown in Fig. 1; Fig. 6, a sectional view on the line $c\,d$ of Fig. 4; Fig. 7, a sectional view on the line $e\,f$ of Fig. 6; Fig. 8, a longitudinal sectional view of the lower portion of the machine, showing the rolls for breaking or folding back the tubes, with one side of the main frame broken away, the driving mechanism of said rolls being omitted; Fig. 9, a horizontal sectional view on the line $t\,u$ of Fig. 1, the driving devices for the breaking-rolls being omitted; Fig. 10, a plan view of the feeding-out or packing devices; Fig. 11, a sectional view on the line $g\,g$ of Fig. 10; Fig. 12, a similar view on the line $h\,h$ of Fig. 10; Fig. 13, a sectional view taken at the end of the shaft carrying the delivery-grippers; Fig. 13$^a$, a sectional view showing the cam for operating said grippers; Fig. 14, a sectional view on the line $i\,i$ of Fig. 4; Fig. 15, a similar view on the line $j\,j$ of said figure; Fig. 16, a similar view on the line $k\,k$; Fig. 17, a similar view on the line $m\,m$; Fig. 18, a similar view on the line $n\,n$; Fig. 19, a section on the line $o\,o$ of Fig. 1; Figs. 20 to 32 are sectional views taken through the various refolding or tube-breaking rollers, showing the succeeding steps in the operation of breaking back or refolding said tubes. Fig. 33, Sheet 1, is a detail sectional view, showing the driving devices operating the frame carrying the feeding-in belt and driving the glue-wheels; Fig. 34, a vertical sectional view on the line $p\,p$ of Fig. 5; Fig. 35, a horizontal sectional view on the line $q\,q$ of Fig. 4, showing the glue-wheel in plan view; Fig. 36, a sectional view on the line r r of Fig. 5; Fig. 37, a vertical sectional view of the glue-pot, taken on the line s s of Fig. 4, the glue-wheel and part of the glue-pot being in elevation; Fig. 38, a perspective view of the push-bar of the blank-ejecting mechanism; Fig. 39, a perspective view of a portion of the blank after being scored and before folding; Fig. 40, a similar view of the tube after being folded, glued and as its end appears when entering the refolding device and also after being refolded or bent and as it appears when delivered; Fig. 41, a similar view of the tube after being refolded or bent on the scored lines on which it was not bent during its formation.

Similar reference letters and numerals in the several figures indicate similar parts.

The tubes to be formed by my present machine are of such length that several shells for slide-boxes may be cut from them, and in Fig. 40 I have shown such a tube as it is delivered from the machine, the blank for such tube having been previously printed or lithographed, and in Fig. 39 I have shown the rear or inner side of a blank after being creased, but before folding. This blank may, of course, be creased on any suitable lines; but in the present machine it is to be creased longitudinally on the lines B B and C C, forming the broad panel A, the middle panel A', and the narrow sides or panels D D', and next to the latter is a narrow pasting flap or edge E, the under side of this pasting-flap being adapted to have the glue applied thereto, so that when the tube-blank is folded by the folding mechanism (to be described) on the lines B B the blank will appear as in Fig. 40, which figure, however, shows the tube turned over as it is delivered from the folding and pasting devices to the refolding or breaking mechanism, and Fig. 41 shows a similar view after it has been refolded or "broken" on the creased lines C C, on which it was not folded during the formation and pasting of the tube, although it is delivered from the machine in the form shown in Fig. 40, being broken or folded back to the form in which it was delivered to the refolding mechanism.

The main frame of the machine may be constructed in any suitable manner, but in the present arrangement consists generally of two sides 1 connected by suitable cross-bars and bolts, and to the upper portion of this frame is secured a supplemental frame 2, consisting of one or more sections and carrying the devices for feeding and folding the blanks, which portion of my invention I will first describe in detail.

The blanks from which the tubes are to be formed consist of strips of more or less flexible cardboard and are placed upon the table 3 between guides 4, preferably adjustable, as shown in Fig. 3, and from the channel thus formed are moved, by hand or otherwise, upon the two traveling belts 5, arranged side by side, as shown in Figs. 3 and 4, said belts passing over a series of pairs of pulleys 6 arranged upon suitable shafts supported in the sides of the frame, one or more of said shafts being adjustable by means of screws 7, by which to tighten said belts, when desired. The belts 5 also pass around a large roller or drum 8, mounted upon a shaft 9 in the frame, which drum is provided with suitable grooves 10 in its periphery for the accommodation of the creasing or scoring ribs or projections 11, formed upon or connected to a creasing-roller 12, secured to the shaft 13, mounted in bearings 14 in the frame and adjustable by means of screws 15, as shown particularly in Figs. 1, 4, and 35. This roller 12 is preferably made up of sections on a sleeve 16 having a clamping-nut 17 and is provided in its periphery with grooves 18 for the accommodation of the belts 5, but may be otherwise constructed, as will be understood.

19 indicates two belts passing around suitable pairs of pulleys 20, arranged upon suitable stationary cross-shafts 21, and also around pulleys 22 on a shaft 23, arranged in suitable bearings in the ends of bars 24 pivoted upon the shaft 25, said arms having connected rigidly to them an arm 26 and constituting a frame pivoted upon the shaft 25 and capable of a movement to bring the lower horizontal stretches of the belts 19 into contact with the upper portions of the belts 5, and as these portions of the belts are traveling in the same direction and at the same speed they may serve to grasp a blank and feed it to the scoring-rollers, previously described. The preferred means for operating this movable frame consists of a link 27, having at its end a roller or projection 28, upon which operates a cam 29 on the shaft 9 of the female creasing-wheel, said cam giving a longitudinal movement to the link 27, which will raise and lower the outer end of the movable frame, as will be understood and as shown particularly in Fig. 33. Pivoted to one of the side frames 2 is a lever 30 connected by a link 31 with the under side of the frame 24, while the inner upturned end of said lever is slotted for the accommodation of a lug formed upon a slide or stop 32, which is held normally pressed upward by means of the spring 33, as shown in Figs. 6 and 7, this construction being such that when the frame 24 is raised the stop 32 is projected above the level of the belts 5 and will arrest any blank that might be placed upon said belts; but when the frame is brought down the stop will be moved below the level of the belt, the blank will be fed by the two traveling belts, a yielding stop being provided, so that if the frame 24 should be raised before the belt had carried off the preceding blank the stop would be held down by the blank; but as soon as the blank had passed it would automatically rise to intercept the next blank and hold it until the frame is raised again. When the blanks are brought down between the belts, they are delivered between belts 19 and pulley 20ˣ, with which latter they are in contact, and then underneath the belts 5 upon the creasing-wheel 8, which also serves as a support for the blank while the glue is being applied to the under edge of the lap.

The glue-pot in the present embodiment of my invention is clearly shown in Figs. 4, 35 and 37, the glue-receptacle proper, G, in which the glue-wheel operates, being connected by a supply-pipe 34 with a reservoir 35 containing liquid glue, the receptacle G having a water-chamber 36 around it, and the reservoir 35 having a water-chamber 40 around it, said two chambers being connected by circulating-tubes 37, in one of which the glue-supply pipe 34 is arranged to prevent chilling during the passage of the glue to the receptacle G. The water-chamber 40 is supported on suitable standards 263, (see Fig. 37,) (omitted from the other figures for clearness,) and the chamber 36 and contained parts are supported by the water and steam pipes or otherwise. Beneath the water-chamber 36 is a steam-chamber 38, having steam entrance and exit pipes 39, and serving to keep the water hot, which water circulates around the reservoir and receptacle and keeps the glue at an even temperature. This arrangement I find advantageous, as it enables me to employ a comparatively small glue-receptacle, such as is necessary in connection with the construction shown, and enables me to keep the glue in good condition at all times.

It will be understood that the glue is supplied to the reservoir and gravitates into the receptacle G, the level in the two being the same.

41 indicates the glue-wheel, driven by a chain 41* from the cross-shaft 41ª, operating in the glue-pot and arranged with its periphery close to the overhanging edge of the scoring-roll 8, a small grooved roller 42 on the arm 43 bearing on the upper edge of the blank and preventing its curling when the glue is applied to it, as seen more particularly in Fig. 37. The arm 43 is adjustably secured upon an arm 45ˣ on the main frame.

Inasmuch as in the operation of a machine of this kind, in which the previously-printed blanks are to be formed into tubes and the printed portions of the blank must register when the tube is completed, it is essential that the blanks be entered in the machine straight and with the edges parallel and that they be scored on lines parallel with the edges before they are introduced into the folding devices, and I provide for guiding the blanks on the belt when they enter the machine by arranging on one side of the belts 5 a rigid guide 45 secured to arms 45ʸ, which are fastened to arms or studs 45ˣ on the main frame 2, and on the other a yielding guide 46 operated by a light spring 47 and guided by suitable studs 48 passing through a rigid bar 49, as seen more particularly in Fig. 3, and it will be noted that after the blank has been entered between the two pairs of belts and adjusted with its edges parallel, that it is bent over the rearmost roller 20ˣ and then beneath said roller, forming a reverse curve by the time its end is entered between the belts 5 and the surface of the drum or female creasing-roller 8, and I arrange guide-plates 206 at the ends of the roller 8, so that if the end is entered approximately correctly there is no possibility of the blank being creased on other than lines parallel with its edges.

I regard as one of the important portions of the machine means for bending the blank around the roller or pulley and holding it in this position while the glue is being applied and it is being creased, as the curving of the blank stiffens it materially and prevents curling and wrinkling. I prefer to employ a pair of belts 5 and a pair of belts 19; but it will be understood that single ones could be employed, if desired.

After the blank has been creased and glue applied to one of its edges it is fed by means of the belts 5 into the devices for folding over the sides of the blank and securing the glued edges in contact.

Referring particularly to Figs. 4 and 14 to 19, 50 indicates a plate secured to the sides of the frame 2, and supported a short distance above it is a blank-supporting plate 51, and supported above this is a suitable forming plate or shoe 52, held upon arms 53. (Shown particularly in Figs. 2 and 4.) Arranged at suitable intervals in the length of the plate 51 are pairs of feeding-rolls 54, which grasp the blank, and being positively rotated move it along toward the rear of the machine, the shoe and plate being cut away at suitable intervals, as will be understood, and between these rollers and at suitable intervals are arranged pairs of folding-rollers adapted to gradually fold the edges of the blank over on the lines B B, previously creased, one side overlapping the other. The first pair of these rollers 55 is shown in Fig. 14, and they operate to turn the edges of the blank over the shoe, and are mounted upon the shaft of the first pair of feed-rolls 54. The next pairs 56, 57, 58, 59, 60, and 61 operate to gradually turn the edges over, as shown in full and dotted lines in Figs. 15, 16, and 17, so that when the blank leaves the folding apparatus the sides are bent over and lapped, the under side of the overlapping portion having been previously glued, and then it passes to the rollers 62, 63, and 64, but the overlapping edge is not pressed down tightly until the end of the blank reaches the periphery of a large drum or roller 70, the upper roller 62 holding the lapping edge down, but not tightly, merely sufficiently to feed the tube, which is somewhat elastic at this time, the reason for delaying the final pressure being that if the entering end of the tube is pressed tight before the folding operation is nearly completed the printing on the lapped portions will fail to register properly, and the sides of the tube will not be parallel, but will be narrower at the front end.

I prefer, instead of making the first pair of folding disks or rollers 55 continuous, to cut away a portion of their peripheries at 55$^x$, as shown in Fig. 4, and of timing said rollers, regarding the rotation of said rollers relative to the feeding mechanism, so that the feeding-rollers 54 will engage the end of the blank before the rollers or disks 55 touch it, thereby insuring the proper feeding, as otherwise the rollers 55 being of greater diameter would fold up the sides, first lifting the end of the blank against the shoe; but this is not an essential construction, as I find in practice that this makes but little difference, the only objection being that there is a tendency to tear the blank on the scored line next the short side with the continuous disks.

At the extreme end of the main frame of the machine is a large drum or wheel 70 mounted upon a shaft 71 supported in suitable bearings in the main frame, and connected to this shaft is a large gear 72 driven from a pinion 73 on a shaft 74, to which latter is also applied a main belt-pulley 75. The periphery of the large wheel 70 is smooth, and arranged around about half of its circumference are a series of rollers 76 mounted upon shafts 77 arranged in suitable boxes 78 guided in radial slots in plates 79, attached to the rear of the main frame and forming a supplemental frame around a portion of the large wheel or drum, suitable adjusting-screws 80 serving to press said rollers 76 76 tightly against the periphery of the drum. Each of the rollers 76 is provided with an annular rib 81 adapted to press the lapped edges of the tube tightly upon the drum while the glue is setting, and two conveying and holding belts 82 are arranged upon opposite sides of the ribs on the small rollers, the said belts being held by the rollers against the periphery of the drum to hold the sides of the tubes down upon the surface of the drum. The shafts 77 of each of the rollers 76 has upon its outer end a pinion 83 meshing with a large gear 72 connected to the drum-shaft, and the belts and rollers are therefore driven at the same surface-speed as the drum, thereby preventing the tubes from slipping on the periphery of the latter and insuring a rolling-pressure between said rollers and the drum, and the lowermost pressing-roller has connected to it a beveled pinion 84 meshing with a corresponding pinion 85 on a longitudinally-extending shaft 86. The belts 82, it will be noted, pass around a pulley 87, the lowermost stretches of said belt being nearly horizontal, as shown particularly in Fig. 8, and serving to deliver the tubes to the refolding or breaking devices.

In Fig. 40 I have shown a view of the end of the tube in the shape in which it enters the refolding or breaking mechanism, (at the right of Fig. 8,) and it will be noted that the cardboard has only been bent on the scored lines B B during the operation of forming. The means employed for turning the blank and bending it on the scored lines C C is a series of pairs of rollers arranged on a suitable supporting plate or frame 96 in the lower portion of the main frame, and in Figs. 1, 5, 8 and 9 I have indicated said rollers only diagrammatically—that is to say, their position and arrangement is shown—but for the sake of clearness the means employed for positively driving said rollers has been omitted, although in Fig. 34 I have shown a means for driving one pair of rollers, and this by means of belts 90 passing around the pulleys 91 on horizontal counter-shafts 92 arranged above them, and it will be understood that similar belts are employed for driving each of the pairs, suitable guide-rollers 93 being employed to direct the belts from their driving-pulleys to the driving-pulleys connected to the rollers. The counter-shafts 92 are in the present embodiment driven from the shaft 86 by means of a sprocket-chain 94, and said two counter-shafts are connected by a chain 95, and are therefore both driven at the same speed.

In Fig. 40 is shown a view of the blank when it enters the first pair of refolding-rollers, (marked 100,) the succeeding pairs being marked 101, 102, and so on up to 113, and the positions of these rollers and the shape of the tube while passing between them is clearly shown in Figs. 20 to 32, inclusive, a detailed description of the specific construction and arrangement of these rollers not being necessary, as they are clearly shown in the figures mentioned. Suffice it to say that when the blank passes out from between the rollers 110, Fig. 29, it is in the shape shown in Fig. 41, being bent or broken on the scored lines C C, while the rollers 111, 112, and 113 bend it back again to the shape shown in Fig. 40, the machine as a whole having bent the pasteboard once on the lines B B during the tube-forming operation and once when folded back to the form in which it is delivered and once on the lines C C. It will be noted that these refolding-rollers are driven at the same surface-speed at which the tube has been traveling through the machine, and I find it desirable to make the rollers 104 and 107, which engage the shell when nearly in rectangular form—that is, just before and after it is bent on the scored lines C C—with the grooves 114 and 115, the angles of the sides of these grooves being, however, a little less than the angles of the sides of the tubes, so that the corners of the tube will not be crushed, but the sides will be engaged at a short distance from the corner, as clearly shown in Figs. 24 and 27. This construction I find to be advantageous, more particularly of the rollers 107, because the blank is to be bent on the new creased lines at this point, and extreme pressure would be liable to crush the corners of the tube.

The refolding or breaking-back device formed by the rollers is in effect a die with four sides movable for conveying the tubes, the shape being approximately indicated by the cross-sections of the tube, (see Figs. 20 to 29,) said sides turning gradually around the plane of the longitudinal axis of the die, and two of the sides approach or are close together at the entrance and gradually separate, while the other two are separated and gradually approach until the center of the die is reached, where the four sides form a substantially-rectangular aperture, and then the two previously-contracted die sides separate and the two previously-separated die sides approach, as shown in Fig. 29, at this point the sides of the die having been given a half-turn on the longitudinal axis.

While the positively-driven rollers are preferred for constituting the movable sides of the die, I do not desire to be confined to this construction, as equivalent traveling carriers, otherwise shaped, could be employed, and it is obvious that though I have shown the tube or box as oblong in cross-section it could be square, if desired.

It is desirable, although not essential, that the tubes after being folded once, as in Fig. 29, be refolded again on the creased lines B to the shape shown in Fig. 40, and the rollers 111, 112, and 113 could be dispensed with, the blanks being delivered to the feeding-out devices in this shape; but I find that it is better to bend the tubes back to the shape shown, as the creased lines are then more flexible and the tube can be set up by hand easier for the reception of the slides.

After leaving the last pair of rolls 113, which refold the blank to the shape shown in Fig. 40, the tubes pass between belts 120 and 121 extending around pulleys 122 and 123, respectively, which are driven at a slightly-greater surface-speed than rollers 113. The lower stretch of the belt 120 and the upper stretch of the belt 121 are in close contact and serve to carry the tube along between them until removed by the ejecting and packing devices, which are shown more particularly in Figs. 10 to 13ª. The shaft on which the driving-pulleys 122 are mounted is driven by a cross-belt 125 (see Fig. 1) through a pulley 126 on a cross-shaft 127 arranged in the upper portion of the machine, and the shaft 123ª carrying the pulleys 123 is driven by a gear 128 from a shaft 122ª, so that said belts will travel at the same surface-speed.

130 indicates a shaft arranged below and a little to one side of the belts 120 and 121 and driven by a gear 131 on a shaft 132, with which meshes a gear 133 on the shaft 86, (see Fig. 10,) and upon said shaft 130 is arranged a series of disks 134, said shaft being also provided with a series of co-operating grippers 135 mounted upon a rock-shaft 136, which latter is in turn supported upon brackets 137 on the shaft 130, said shaft 136 also having a crank-arm 138 at its end adapted to engage adjustable cam-plates 139 secured to the end plate or casting 140, as shown in Fig. 13ª, and a spring 141 connected to the shaft 136 and to one of the disks 134 thereon operates to turn the shaft and hold the grippers in the position shown in full lines in Fig. 13; but as the shaft 130 rotates the crank-arm 138 will engage the cams 139 and cause the grippers to be turned to the position shown in dotted lines in said figure, gripping the edge of the tube, which has been carried between the belts, and as the shaft 130 rotates, said tube will be carried around to the lowest position in dotted lines in said figure, where it will be released by the projection on the lower camplate 139 engaging the crank. The tubes carried along between the belts 120 and 121 are ejected or pushed from between the belts into the gripper by a pusher 142 having rearward arms 143 operating in suitable guides in the frame 144. Connected to the arms 143 are links 145 pivoted to the upper arms of the levers 146 mounted upon a shaft 147 supported in suitable bearings, an arm 148 secured to said shaft having connected to it a link 149 slotted for the passage of the shaft 132, upon which latter is arranged a cam 150 operating upon a pin 151 on said link, said cam normally holding the pusher retracted, as shown in full lines in Fig. 12; but when the pin 151 drops into the lower portion of the cam a spring 152 connected to the arm 146 will operate the pusher to eject the blank from between the belts and move it into the grippers. Upon the engaging-face of the pusher 142 are provided lugs 153, inclined and cut away at their upper edges, as shown in Figs. 10 and 38, so that if there is any tendency on the part of the tube to sag on the rear side it will be lifted by said inclined lugs, and its proper positioning will be insured when the pusher moves forward to eject it.

As before stated, the grippers after having removed the tube from between the belts are opened when they have carried the blank over substantially level with the top of the receiving and packing table 154. This table is provided with slots at its edge, as shown, and also with guides to receive a suitable sliding frame 155 having packer-fingers 156 that normally lie to the rear of the gripper-disks, as in full lines, Fig. 11; but after the tube has been carried around and released by the gripper this packer operates to move the tube and the preceding ones along the table, as shown in dotted lines in said figure. The particular means for causing the movement of the packer-fingers 156 consists, in the present instance, of a link 157 connected to the upper end of the lever 158 loosely mounted upon the shaft 147, the lower end of said lever being connected to the link 159, which is slotted for the passage of a shaft 132, and the projection 160 is operated upon by the cam 161, also upon said shaft 132, said cam causing the positive motion of the packers, while their retraction is caused by the spring 162 connected to the movable frame 155 and to the stationary frame.

In order to prevent the tubes from being carried too far by the belts I arrange a stop-plate 163 over them, as shown in Fig. 13ª, the depending edges of which project below the space between the belts and serve to engage the end of the tube, which might have become slightly displaced in its passage through the machine. The parts last described are so timed relative to the feeding-in devices of the machine that when the extreme end of the tube reaches, or just before it reaches, the stop 163, the pusher will operate to eject the tube from between the belts, the grippers at the same time engaging it and carrying it around until deposited upon the top of the receiving-table, when the packers will move it out of the way of the next succeeding tube.

Although other conveying devices for the tubes could be used in place of the belts 120 121, I much prefer to employ the latter, as they not only feed the blanks well, but the tubes may be readily removed laterally from them by reason of a slight yielding of the belts between their pulleys, which is also preferable in connection with the gripping devices movable in a plane at an angle to their plane of movement, the tubes not being bent longitudinally at all, as the belts might be slightly separated between their pulleys when the tube is carried out and down. It is advisable to pack these tubes on edge, as they then occupy less space and may be readily handled.

I have not described herein the means employed for driving the various rollers and shafts; but such gearing and belts are indicated on the drawings as are necessary for a clear understanding of the construction and operation of the parts by one skilled in the art, and specific description is therefore not deemed necessary.

The operation of the parts will now be understood. The blank strips of cardboard are fed into the machine and are creased while firmly held from lateral movement, and then glue is applied to one edge, and the sides are folded on two of the creased lines and the lapped edges pressed in contact and firmly held on a traveling support until the glue has united them firmly, when the tubes thus formed are bent back or broken on the previously scored or creased lines, and they are ejected from the machine complete and ready to be cut into suitable sections constituting shells for slide-boxes.

While it is preferable that the tubes be made of sufficient length to be severed into a number of shells, it is obvious that single shells or that complete folding boxes could be made on this machine by varying the construction of the scoring-rolls so as to cut and score on different lines and the relative arrangement of the folding and refolding rolls changed, as required.

I do not claim herein the means shown and described for refolding the tubes, as this forms the subject-matter of a divisional application filed by me December 20, 1895, Serial No. 572,763.

I claim as my invention—

1. The combination in a machine such as described with a pair of creasing-rolls, of a blank-conveying belt having a horizontal stretch for receiving a blank and passing around one of the creasing-rolls, a second conveying-belt having a stretch parallel and in contact with the horizontal stretch of the first-mentioned one, a supporting-roller therefor over which the blank passes, and a guide-roll for delivering the blank between the first-mentioned belt and one of the creasing-rolls, substantially as described.

2. In a machine such as described, the combination with a pair of creasing-rolls, a belt co-operating with one of said rolls operating to hold and curve a blank thereon, and a gluing device arranged below the surface of the creasing-roll and applying glue to the curved overlapping edge of the blank, substantially as described.

3. The combination with a supporting-roll and holding devices for curving a blank around it with its edge overlapping the edge of the roll, of a glue-applying device for applying glue to the inner curved overlapping edge of the blank, substantially as described.

4. The combination with a supporting-roll and holding devices for curving a blank around it with its edge overlapping the end of the roll, of a glue-receptacle and a glue-applying wheel operating therein and arranged inside the periphery of the supporting-roll, substantially as described.

5. The combination with a pair of creasing-rolls, and devices for curving and holding a blank around one of them, of a glue-wheel arranged at one end inside the periphery of the creasing-roll adapted to apply glue to the overlapping edge of a blank, substantially as described.

6. In an organized machine for operating upon separate blanks, the combination with blank conveying or feeding devices, of a pair of creasing-rollers, holding devices, substantially as described for curving the blank around one roller of the pair, a blank-guide at one end of said roller, a gluing device, folding devices substantially as described for forming the creased and glued blanks into tubes, and conveying devices, substantially as described for conveying the blanks from the creasing-rollers and through the folding devices, as set forth.

7. The combination with a blank-supporting roll, as 8, and devices for curving a blank around it and holding it in contact therewith, of a glue-applying wheel inside the periphery of the roll and at one end thereof, and a grooved guide outside the periphery of the roll against which the blank edge is held by the glue-roller, substantially as described.

8. The combination with the upper and lower conveying-belts having horizontal stretches in contact, of a pair of creasing-rolls and guide-rollers for directing the lower conveying-belt partially around one roll of the pair, the blank-supporting roller around which the upper belt passes arranged to direct the blank between the creasing-roller and lower belt, substantially as described.

9. The combination with two traveling blank-conveyers (as belts) relatively movable toward and from each other to feed a blank between them, a yielding stop connected to and actuated by the relative movement of said conveyers toward and from each other, said stop projecting between the conveyers when they are separated and removed when they are brought together, substantially as described.

10. The combination with the frame, the lower blank-supporting belt having the horizontal stretch, the upper movable frame, the conveying-belt thereon having the horizontal stretch, a yielding stop for arresting a blank on the lower belt connected to and actuated by the movable belt-carrying frame, substantially as described.

11. The combination with the main frame, the belts 5 and 19, the movable frame 24, the movable arm 30 connected thereto, and the spring-actuated stop 32, arranged and operating substantially as described.

12. As a means for forming separate paper blanks into tubular form, the combination with the slotted shoe or former and a series of rollers for engaging the outer sides of the blank and gradually turning them both, causing one side to overlap the other, of a series of pairs of feeding-rollers located at intervals between the folding-rollers, and arranged to grip a single thickness of the blank between the sides thereof and feed it positively, while the sides are being folded, substantially as described.

13. In an organized machine for forming separate paper blanks into tubular form, the combination with blank supporting and conveying devices, a device for applying glue to one side of a blank, and a slotted shoe or former, of a blank-folding device embodying a series of rollers engaging the outer sides of the blank and gradually turning them both to form a tube as the blank is moved between them, and a series of pairs of positively-driven feeding-rollers located at intervals between the folding-rollers and arranged to grip a single thickness of the blank between the sides thereof and feed it positively while the sides are being folded, substantially as described.

14. In an organized machine for forming separate paper blanks into tubular form, the combination with a device for applying glue to one side of a blank, and a slotted shoe or former, of a series of rollers for engaging the sides of the blanks and gradually folding them both over, one upon the other, a series of pairs of driven feeding-rollers located at intervals between the folding-rollers and arranged to grip a single thickness of the blank between the sides thereof and feed it positively while the sides are being folded, and pressing-rollers for exerting pressure on the lapped and glued edges of the folded blank, substantially as described.

15. In an organized machine for forming separate paper blanks into tubular form, the combination with a pair of creasing-rollers, and a gluing device for applying glue to the blank, of a slotted shoe or former, a series of rollers for engaging the sides of the blank and gradually turning them both over and lapping them, and a series of pairs of driven feeding-rollers located intermediate the folding-rollers and arranged to grip a single thickness of the blank between the sides thereof and feed it positively, substantially as described.

16. In an organized machine, the combination with a gluing device for applying glue to one edge of a blank, and a shoe or former, of folding devices for gradually folding over the edges of the blank with the glued surface between, a large drum, a gear connected therewith, a series of spring-pressed rollers arranged around the drum and pressing directly on the lapped edges of the blank and having gears meshing with the larger gear and belts or tapes for holding the blanks on the drum substantially as described.

17. In an organized machine, the combination with a gluing device for applying glue to one side of one edge of a blank, and a shoe or former, of folding devices for gradually folding over the sides of the blank one upon the other with the glued surface between, a wheel or drum, a series of rollers arranged around said drum having a raised portion or rib for engaging the lapped edges of the folded blank, and the lower portions on opposite sides, and the blank holding and conveying belts arranged between the lower parts of the rollers and the drum, substantially as described.

18. In an organized machine, the combination with a slotted shoe or former, of a series of rollers on opposite sides thereof operating to gradually fold the sides of the blank one upon the other, a series of pairs of feeding-rollers arranged above and below the blank to engage a single thickness thereof and positively feed it through the folder, and a pair of feed-rollers, as 62, operating to feed the folded blank, but not compress the lapped edges tightly, substantially as described.

19. The combination with devices for folding blanks into tubular form, of a forming-shoe, having a slot, a blank-feeding roller operating in the slot of the shoe, a feed-roller below the shoe and co-operating with the other feed-roller, and a pair of turning-disks on the shaft of one feeding-roller arranged on opposite sides of the shoe, whereby the blank will be simultaneously fed by the rollers and its edges bent up at the sides of the shoe, substantially as described.

20. The combination with devices for folding blanks into tubular form, of a forming-shoe, a pair of feeding-rollers arranged above and below the blank and rotating in the plane of its movement, and two turning rolls or disks arranged on the shaft of the lower roll of the pair and larger than the feed-roll thereon for engaging the sides of the blank and turning them upward, a portion of the periphery of said disks or wheels being cut away to permit a blank to be caught by the feed-wheels before the edges are turned by the disks, substantially as described.

21. In a blank-folding mechanism, the combination with a shoe, of a pair of blank-feeding rollers arranged above and below it, and a pair of disks or wheels larger than the feed-roller arranged on the opposite sides of the lower roller, and having portions of their peripheries cut down to substantially the periphery of the feed-roller, substantially as described.

22. The combination with blank-conveying devices, substantially as described for moving folded tubes, &c., endwise, of the movable pusher for pushing the tubes laterally from the conveyers, and gripping devices movable laterally of the conveyers for positively engaging the tube and removing it, substantially as described.

23. The combination with the two conveying-belts traveling in contact, of the pusher movable laterally of said belts for moving a tube from between them, and the grippers for grasping the sides of the tube, substantially as described.

24. The combination with the two belts traveling in contact, of the pusher movable laterally of the belts, the rotary shaft, and the grippers thereon, and the slotted receiving-table, substantially as described.

25. The combination with the two belts traveling in contact, of the pusher movable laterally of the belts and having the supporting-lugs thereon, and gripping devices for receiving the blanks from the belts, substantially as described.

26. The combination with the two belts traveling in contact, of the pusher-bar movable laterally of the belts, having the inclined and tapering lugs therein, and gripping devices for receiving the blanks from the belts, substantially as described.

27. The combination with the two belts traveling in contact, of the pusher movable laterally of the belts, the rotary shaft having the grippers thereon, devices substantially as described for operating the grippers, the receiving-table and the packers operating between the grippers, substantially as described.

28. The combination with the blank-conveying devices, and the pusher movable laterally thereof, of the shaft having the grippers, the cams for operating them, and the slotted receiving-table, substantially as described.

29. The combination with the blank-conveying devices, and the pusher movable laterally thereof, of the shaft having the grippers, the cams for operating them, the receiving-table, the packers operating between the grippers and connections for operating the pusher when the grippers are open beside the conveying devices, substantially as described.

30. The combination with the two conveying-belts, the pusher movable laterally thereof, the shaft having the disks, and movable gripping-fingers thereon and arranged below and at one side of the belts, the cams for operating the fingers, the receiving-table, the packer, the cam-shaft and connections between it and the pusher, and the packer, substantially as described.

31. In an organized machine, the combination of blank-feeding devices, creasing-rolls for creasing the blanks longitudinally on four lines, a blank-gluing wheel, folding devices for folding the blanks on two of the creased lines and securing their edges, a tube-refolding die having traveling sides operating to refold the tubes on the creased lines on which they were not folded during the forming operation, rollers for bending the tubes back on the creased lines on which they were bent during the forming operation, traveling conveyers for receiving and conveying the tubes longitudinally, and ejecting devices for removing the tubes laterally from the conveyers, substantially as described and for the purpose specified.

HENRY R. CORKHILL, JR.

Witnesses:
F. F. CHURCH,
O. C. ROBBINS.